(12) United States Patent
Forsythe et al.

(10) Patent No.: US 6,238,008 B1
(45) Date of Patent: May 29, 2001

(54) WHEEL AND TENSION SPOKE SYSTEM

(76) Inventors: Paul D. Forsythe, 530 W. Surrey Ave., Phoenix, AZ (US) 85029; Douglas M. Hoon, 93 Water St., Guilford, CT (US) 06437-2863

( * ) Notice: Subject to any disclaimer, the term of this patent is extended or adjusted under 35 U.S.C. 154(b) by 0 days.

(21) Appl. No.: 09/391,978

(22) Filed: Sep. 8, 1999

(51) Int. Cl.[7] .............................. B60B 1/02; B60B 21/06; B60B 3/00
(52) U.S. Cl. ................................ 301/55; 301/57; 301/59; 301/75
(58) Field of Search ............................... 301/55 I, 57, 58, 301/59, 61, 64.7, 75, 81, 104, 110.5

(56) References Cited

U.S. PATENT DOCUMENTS

| | | |
|---|---|---|
| D. 388,757 | 1/1998 | Johnson . |
| D. 388,758 | 1/1998 | Johnson . |
| D. 412,691 | 8/1999 | Sands . |
| 703,029 * | 6/1902 | Wilske ................................. 301/104 |
| 779,807 | 1/1905 | Schofield . |
| 1,432,191 | 10/1922 | Lachman . |
| 1,466,097 * | 8/1923 | Homewood ........................... 301/104 |
| 1,862,804 | 6/1932 | Pugh . |
| 2,378,154 | 6/1945 | Nelson . |
| 4,054,324 | 10/1977 | Casadio . |
| 4,626,036 * | 12/1986 | Hinsburg et al. ....................... 301/59 |
| 4,695,099 * | 9/1987 | Klein ..................................... 301/58 |
| 5,445,439 | 8/1995 | Dietrich . |
| 5,578,154 | 11/1996 | Britten . |

FOREIGN PATENT DOCUMENTS

| | | |
|---|---|---|
| 5579702 | 6/1980 | (JP) . |
| 2299901 | 12/1990 | (JP) . |
| 1382668 | 3/1988 | (SU) . |

* cited by examiner

*Primary Examiner*—S. Joseph Morano
*Assistant Examiner*—Jason R. Bellinger
(74) *Attorney, Agent, or Firm*—Schmeiser, Olsen & Watts

(57) ABSTRACT

A spoke system includes at least three rim pivots, at least three hub pivots, and plural shafts each extending along a substantially linear path between a rim pivot and a hub pivot, each path being substantially aligned with the center of a rim pivot and the center of a hub pivot. Each shaft includes an integral rim end forming a loop around a rim pivot and an integral hub end forming a loop around a hub pivot. The present invention also includes a tensioning system for biasing the inner vertices away from the outer vertices, thereby tensioning the continuous spoke. The path of each shaft may be substantially aligned with the center of a rim pivot and the center of a hub pivot so that a tension along the length of the shaft will not produce a moment about the rim pivot or the hub pivot. The tensioning system may include plural tensioning mechanisms, with each tensioning mechanism including a clevis with a base attached to the hub and two arms extending from the base, a reaction pin extending between the two arms, a hub attachment pin extending through a central portion of a vertex, a pusher pad engaging the hub attachment pin, and a tension adjusting screw engaging the reaction pin and biasing the pusher pad so as to bias the hub attachment pin and the vertex, thereby tensioning the shafts.

30 Claims, 10 Drawing Sheets

WHEEL AND TENSION SPOKE SYSTEM

BACKGROUND OF THE INVENTION

1. Technical Field

This invention generally relates to wheels, and more specifically relates to spoke systems for wheels.

2. Background Art

A typical wheel, such as a bicycle wheel, includes a rim, a hub, and a spoke system for keeping the rim stationary relative to the hub. Spoke systems have traditionally been of two main types: compression spoke systems, and tension spoke systems. Some spoke systems use both compression and tension. Compression spoke systems and systems that combine compression or tension and shear typically require weightier spokes than tension spoke systems to prevent buckling of the spokes. Accordingly, tension spoke systems are common because they allow for thinner, and thus lighter, spokes. Such systems have typically used metal rods, such as steel rods, for spokes. Such rods do not have extremely high tensile strengths for their weight, but they are easily connected at their ends to the rim and the hub.

Some have tried to use composites in spoke systems. Some such systems have lacked sufficient durability for effective use in vehicles because the connections to the rim and the hub are not sufficiently durable or strong. Other systems, because of these problems, have included composites in systems that combine compression or tension and shear. Such systems require larger, and thus heavier spokes to prevent buckling.

DISCLOSURE OF INVENTION

Accordingly, a need exists for a tension spoke system and a wheel using the same that have sufficient durability and that are lightweight. The present invention provides such a system and wheel.

According to the present invention, a spoke system includes at least three rim pivots, at least three hub pivots, and plural shafts each extending along a substantially linear path between a rim pivot and a corresponding hub pivot, each path being substantially aligned with the center of a rim pivot and a hub pivot. Each shaft includes an integral rim end forming a loop around a rim pivot and an integral hub end forming a loop around a hub pivot. The present invention also includes a tensioning system for tensioning the shafts.

The path of each shaft may be substantially aligned with the center of a rim pivot and a hub pivot so that a tension along the shaft will not produce a moment about the rim pivot or the hub pivot. Because tension in a shaft will not produce such a moment, the shaft will not be subjected to significant bending or shear stresses. Accordingly, the durability and strength of each shaft is increased. This is especially true if the spokes are composite spokes that are strong and durable in tension.

The tensioning system may include plural tensioning mechanisms. Each tensioning mechanism may include a clevis with a base attached to the hub and two arms extending from the base, a reaction pin extending between the two arms, a hub attachment pin extending through a central portion of a vertex, a pusher pad engaging the hub attachment pin, and a tension adjusting screw engaging the reaction pin and biasing the pusher pad so as to bias the hub attachment pin and the vertex, thereby tensioning the continuous spoke. Each tensioning mechanism may be located near the hub so that the polar moment of inertia of the wheel is minimized.

The foregoing and other features and advantages of the invention will be apparent from the following more particular description of preferred embodiments of the invention, as illustrated in the accompanying drawings.

BRIEF DESCRIPTION OF DRAWINGS

Embodiments of the present invention will hereinafter be described in conjunction with the appended drawings, where like designations denote like elements.

MODES FOR CARRYING OUT THE INVENTION

Figure 1:
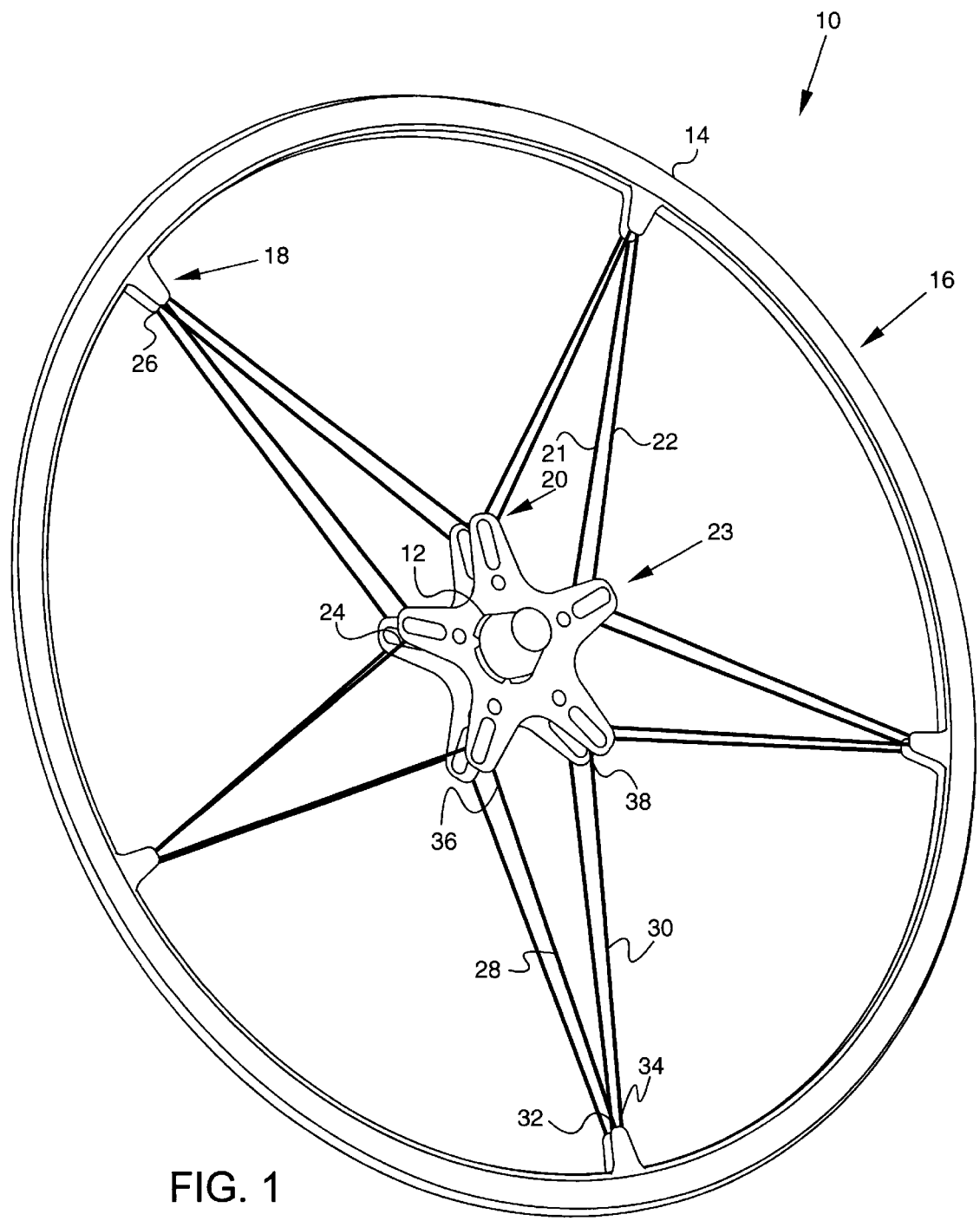
FIG. 1 is a perspective view of a wheel according to the present invention.
Figure 2:
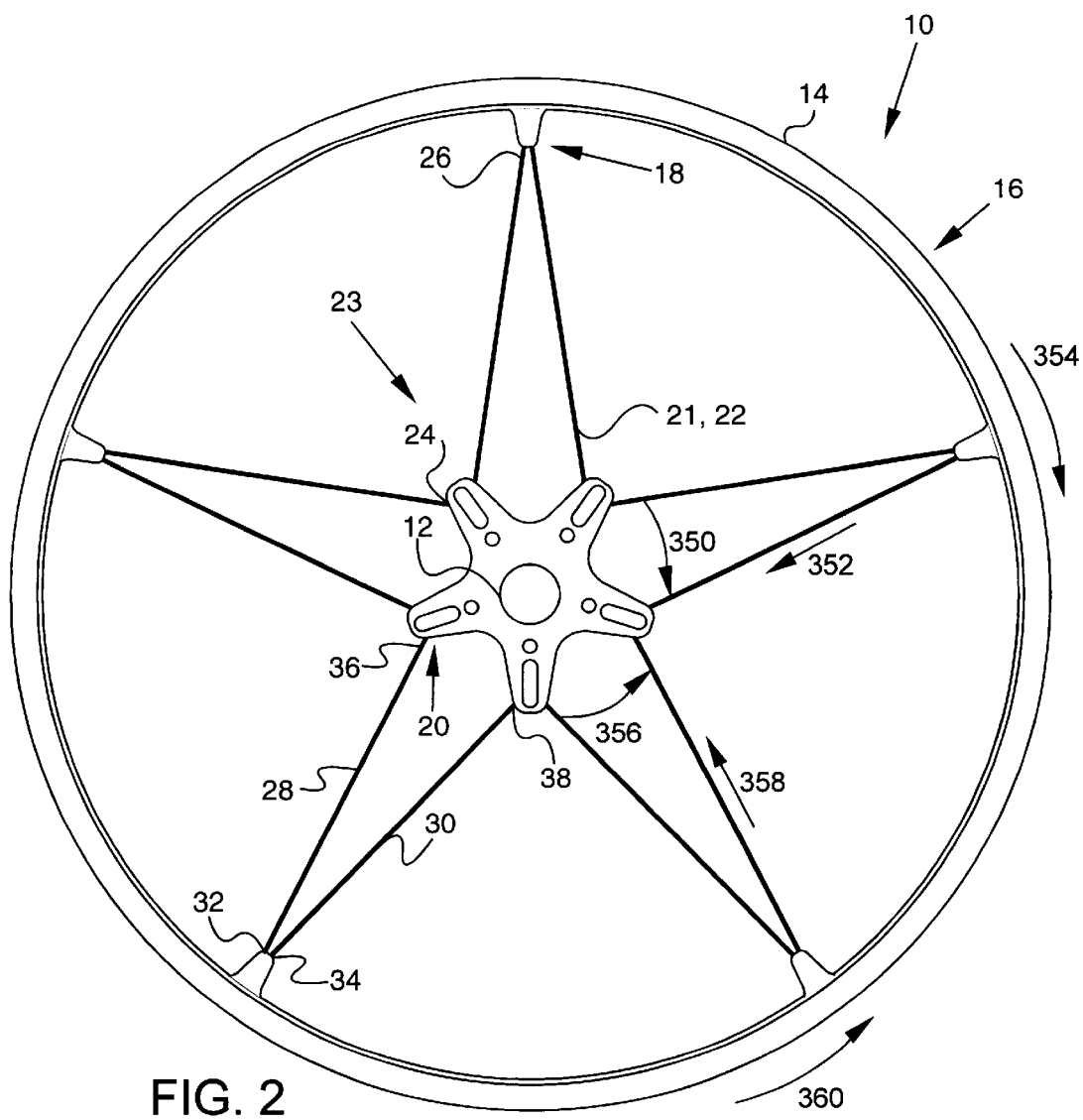
FIG. 2 is a side plan view of the wheel of FIG. 1.
Figure 3:
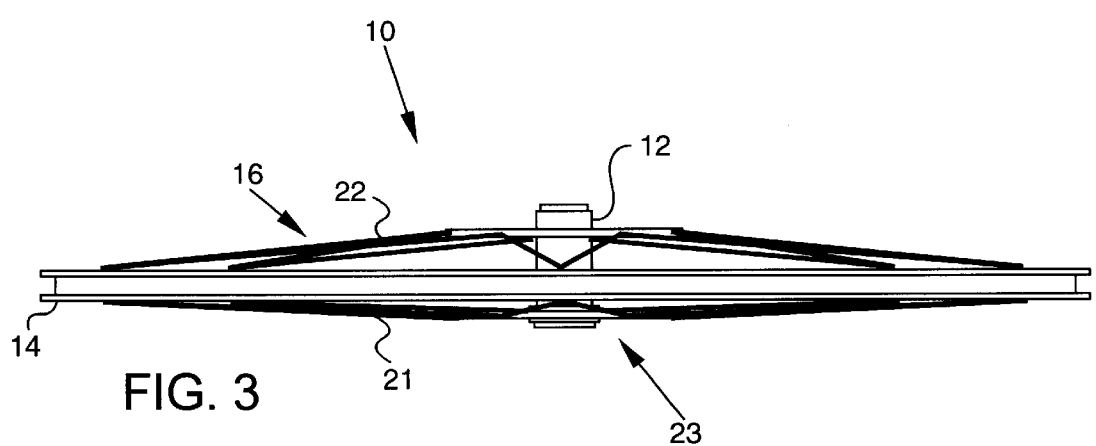
FIG. 3 is a top plan view of the wheel of FIG. 1.

Referring to FIG. 1–3, a wheel 10, such as a bike wheel, includes a hub 12 that rotates about a rotational axis, a rim 14, and a spoke system 16 that keeps rim 14 stationary relative to hub 12 by transmitting force and torque from between rim 14 and hub 12. Spoke system 16 preferably includes at least three rim pivots 18 and at least three hub pivots 20 that are located radially inwardly from rim pivots 18 and that are circumferentially offset from rim pivots 18. Spoke system 16 also preferably includes a continuous spoke 21, 22, and a tensioning system 23 for tensioning the continuous spoke 21, 22.

Each continuous spoke 21, 22 has at least three inner vertices 24 each connected to a hub pivot 20, at least three outer vertices 26 each connected to a rim pivot 18, and shafts 28, 30. Each shaft 28, 30 extends from a rim pivot 18 to a corresponding hub pivot 20 (as can be seen in FIG. 1, each rim pivot 18 can correspond to more than one hub pivot 20, and each hub pivot 20 can correspond to more than one rim pivot 18). In a preferred embodiment shown in FIG. 1, spoke system 16 includes a right continuous spoke 21 that includes plural shafts 28, 30 that slope to the right side as they extend inwardly from rim 14 toward hub 12. A left continuous spoke 22 includes plural shafts 28, 30 that slope to the left side as they extend inwardly from rim 14 toward hub 12. Inner vertices 24 and outer vertices 26 of right continuous spoke 21 are preferably circumferentially aligned with inner vertices 24 and outer vertices 26 of left continuous spoke 22. However, the two continuous spokes 21, 22 may be circumferentially offset so that inner vertices 24 and outer vertices 26 of each continuous spoke 21, 22 are not aligned.

Spoke system 16 may include a single continuous spoke, rather than right continuous spoke 21 and left continuous spoke 22, wherein the continuous spoke includes plural shafts 28, 30 that slope to the right side as they extend inwardly from rim 14 toward hub 12 and plural shafts 28, 30 that slope to the left side as they extend inwardly from rim 14 toward hub 12.

Each shaft 28, 30 preferably has an integral rim end 32, 34 that forms a loop around a rim pivot 18 to form a pivotal connection, and an integral hub end 36, 38 that forms a loop around a hub pivot 20 to form a pivotal connection. Each shaft 28, 30 extends between an inner vertex 24 and an outer vertex 26 so that the continuous spoke 21, 22 forms a continuous pattern. In the embodiment shown in FIG. 1, each continuous spoke 21, 22 has five inner vertices 24 and five outer vertices 26, but the number of vertices may vary depending on the application and the amount and type of materials included in the continuous spoke. Each inner vertex 24 preferably defines a hole 40 (see FIG. 9) that is substantially normal to a plane that substantially includes shafts 28, 30 that terminate at vertex 24, and each outer vertex 26 preferably defines a hole 42 (see FIG. 5) that is substantially normal to a plane that substantially includes shafts 28, 30.

Preferably, each shaft 28, 30 forms a substantially linear path 44, 46 (see FIG. 10) that is substantially aligned with the center of a rim pivot 18 at rim end 32, 34 and the center of a hub pivot 20 at hub end 36, 38 and that is not aligned radially with hub 12. However, if spoke system 16 need not transfer significant torque to rim 14, such as in a front bike wheel, paths 44, 46 may be aligned radially with hub 12.

Figure 4:
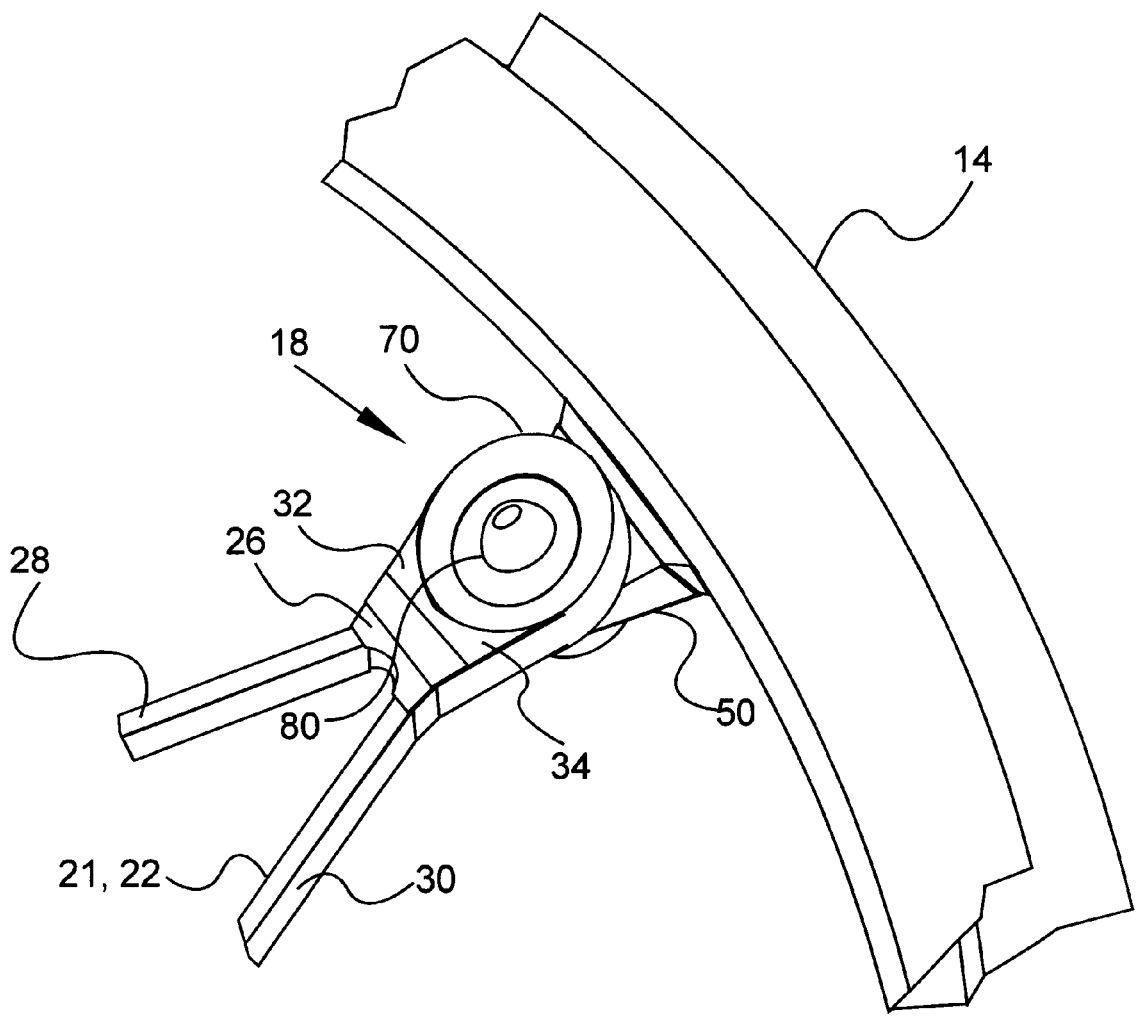
FIG. 4 is a perspective broken-away view of a rim pivot and an outer vertex according to the present invention.
Figure 5:
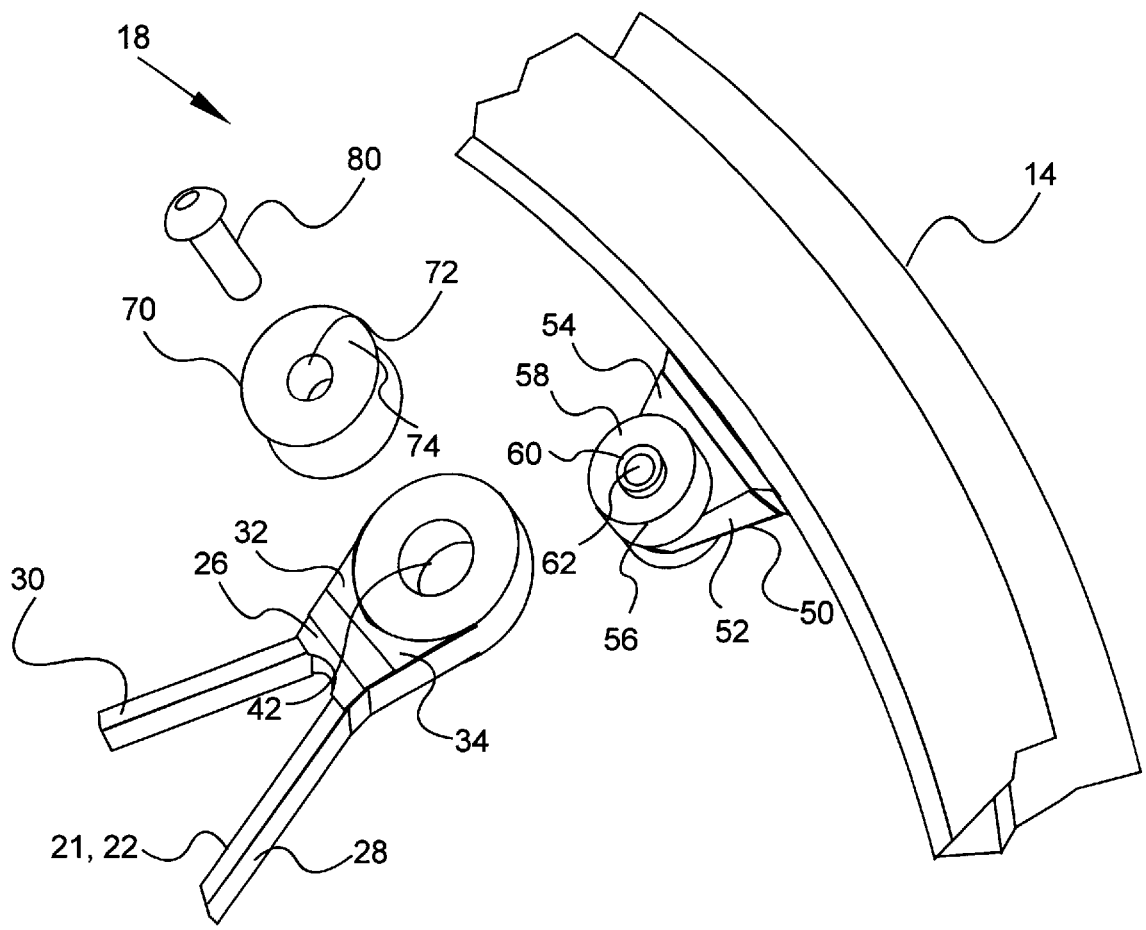
FIG. 5 is an exploded perspective view of the rim pivot and outer vertex of FIG. 2.

Referring now to FIGS. 4–5, each rim pivot 18 pivotally connects an outer vertex 26 to rim 14. Each rim pivot 18 preferably includes a rim tab 50 that is secured to rim 14. Rim tab 50 is preferably secured to rim 14 by a weld. However, it may be secured in some other manner, such as by a mechanical fastener, or it may be formed integrally with rim 14. Referring to FIG. 5, rim tab 50 preferably includes a body 52 that is secured to rim 14 and that extends radially inwardly from rim 14. Body 52 has opposing inclined surfaces 54 that slope axially outwardly as body 52 extends radially inwardly. A boss 56 extends away from each inclined surface 54, forming a surface 58 thereon that is substantially parallel to inclined surface 54. A shoulder 60 extends away from each boss 56. Each rim tab 50 also defines a pair of threaded holes 62. Each threaded hole 62 preferably is substantially coaxial with shoulder 60 and is substantially normal to inclined surface 54.

Each rim pivot 18 preferably also includes a rim bobbin 70. Each rim bobbin 70 includes a cylindrical tube 72 and a pair of substantially parallel radial walls 74 extending radially outwardly from opposing termini of cylindrical tube 72. Each rim bobbin 70 is wrapped with fibers that form an outer vertex 26 of continuous spoke 21, 22 about cylindrical tube 72 and between radial walls 74. One radial wall 74 of each rim bobbin 70 abuts surface 54 of rim tab 50, and the inner counter-bored surface of cylindrical tube 72 fits snugly around the outer surfaces of shoulder 60 and boss 56. Each rim pivot 18 preferably also includes a rim attachment pin 80, such as a button head screw, that extends through cylindrical tube 72 and that engages threaded hole 62 to pivotally attach outer vertex 26 to rim tab 50, and thus to rim 14. Preferably, each threaded hole 62 and each shoulder 60 are substantially normal to a plane that substantially includes shafts 28, 30 that terminate at outer vertex 26 so that a tension force from either shaft 28, 30 will apply a force normal to shoulder 60 and rim attachment pin 80, and will not tend to pull rim attachment pin 80 out of threaded hole 62.

Figure 6:
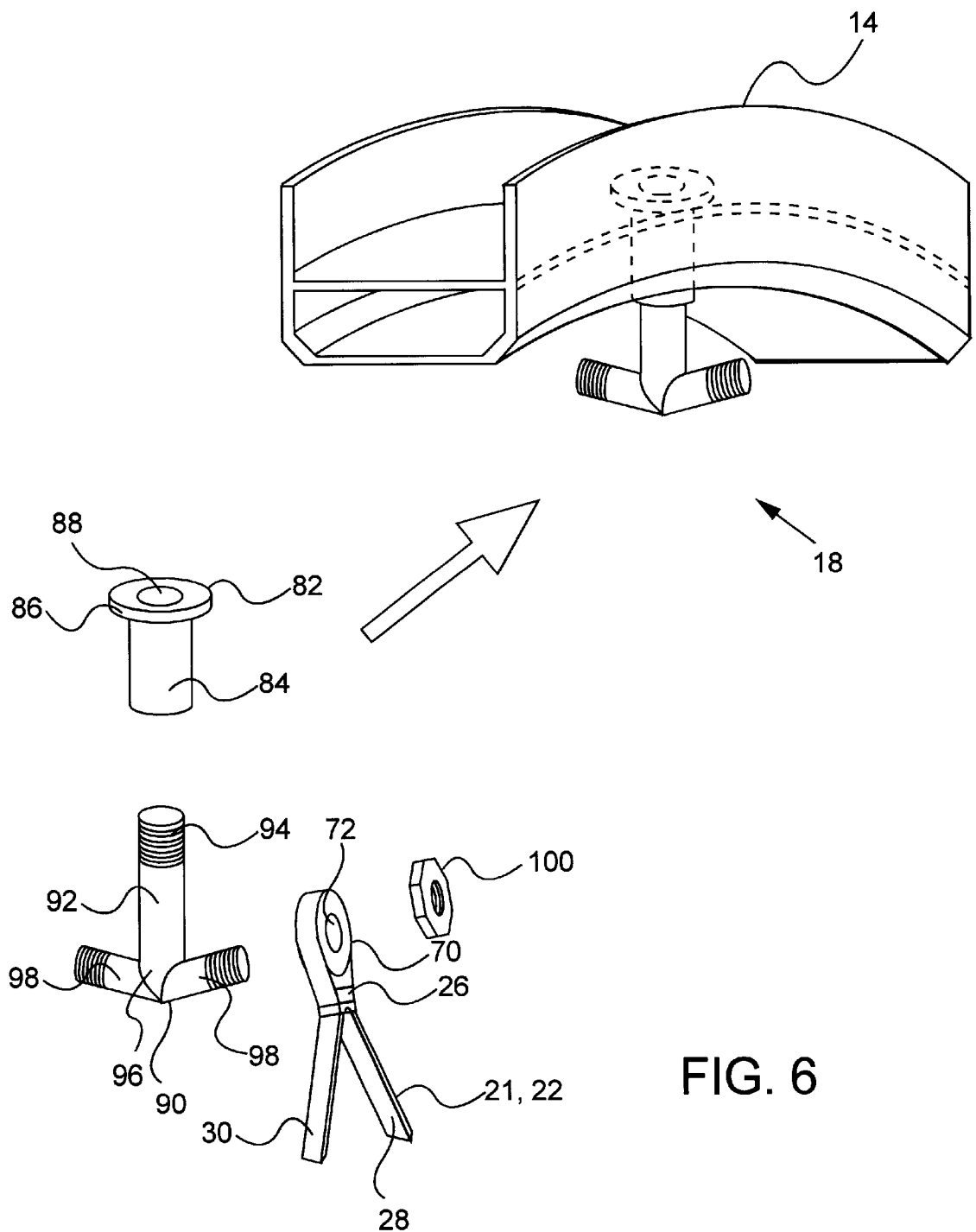
FIG. 6 is an exploded broken-away perspective view of an alternative embodiment of a rim pivot and outer vertex according to the present invention.

Referring now to FIG. 6, rim pivot 18 alternatively includes a nipple 82 that is attached to rim 14 and that extends inwardly from rim 14. Nipple 82 preferably includes a cylindrical body 84 and an annular flange 86. In this embodiment, cylindrical body 84 extends through a hole in rim 14 and annular flange 86 abuts rim 14 to keep cylindrical body 84 from being pulled inwardly. Nipple 82 also preferably defines a threaded hole 88 that is substantially coaxial with body 84. A T-bolt 90 includes a body 92 that is threaded at a first end 94. First end 94 mates with hole 88 in nipple 82 and body 92 extends inwardly therefrom.

From an opposing second end 96 of body 92, a pair of arms or rim attachment pins 98 extend substantially normal to the plane of rim 14 in substantially opposing directions. Each arm 98 extends through a cylindrical tube 72 in a rim bobbin 70 and receives a spoke retention nut 100 to retain rim bobbin 70, and thus outer vertex 26 on arm 98. Each arm 98 preferably angles slightly outwardly toward first end 94 so that its axis is substantially normal to a plane that substantially includes shafts 28, 30 that terminate at outer vertex 26 so that a tension force from either shaft 28, 30 will apply a force normal to arm 98, and will not apply a significant force to spoke retention nut 100 or apply a significant bending moment to vertex 26. In this embodiment, nipple 82 may be freely rotatable relative to rim 14 so that nipple 82 may be turned to adjust the tension in spoke system 16. Thus, nipples 82 and T-bolts 90 may serve as a tensioning system 23 either alone or in combination with the tensioning system 23 described below.

Figure 7:
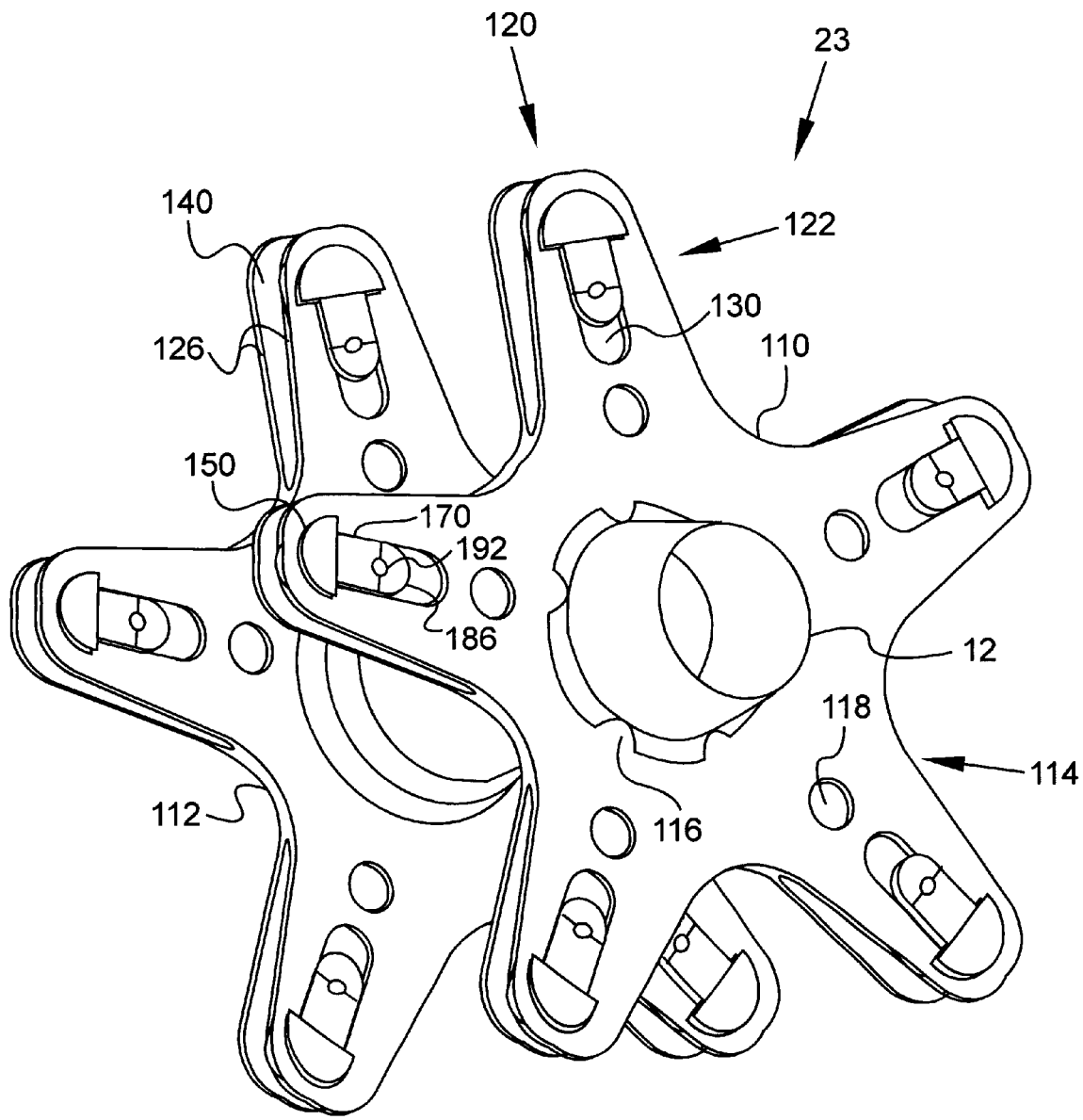
FIG. 7 is a perspective view of a hub and a tensioning system according to the present invention.

Referring now to FIG. 7, tensioning system 23 preferably includes a pair of spoke anchors 110, 112 that extend radially outwardly from opposing ends of hub 12. Spoke anchors 110, 112 preferably each include a ring 114 having plural circumferentially spaced inwardly-extending torque reacting teeth 116 that mate with hub 12 and help to transfer torque between hub 12 and spoke anchors 110, 112. Hub 12 is preferably a conventional hub, except that it is fitted to receive spoke anchors 110, 112. Ring 114 also defines plural circumferentially spaced holes 118 therein to reduce the weight of ring 114. Each spoke anchor 110, 112 may be secured to hub 12 by an adhesive or it may be welded. Each spoke anchor 110, 112 angles inwardly toward rim 14 so that each spoke anchor 110, 112 forms a frustoconical shape. If wheel 10 is a front wheel, each spoke anchor 110, 112 will preferably have substantially the same cone angle (the angle between a radial plane and spoke anchor 110, 112). In a preferred embodiment, the front left and right cone angles are about 6.3 degrees. However, if wheel 10 is a rear wheel, and a cog is included within the vehicle frame, but to the right of the wheel, then the cone angle of the right spoke anchor is preferably smaller than the cone angle of the left spoke anchor because rim 14 is axially offset from hub 12 (see FIG. 3). In one embodiment, the right cone angle is about 4.3 degrees and the left cone angle is about 6.3 degrees.

Tensioning system 23 further includes plural circumferentially spaced tensioning mechanisms 120 located near hub 12. It is not only advantageous to decrease the overall weight of the wheel, it is also advantageous to distribute the weight so as to decrease the polar moment of inertia of the wheel. An object has a lower polar moment of inertia if it has more of its weight near the axis of rotation. Accordingly, tensioning mechanisms 120 are preferably located near hub 12 so that they are close to the rotational axis of wheel 10.

Figure 8:
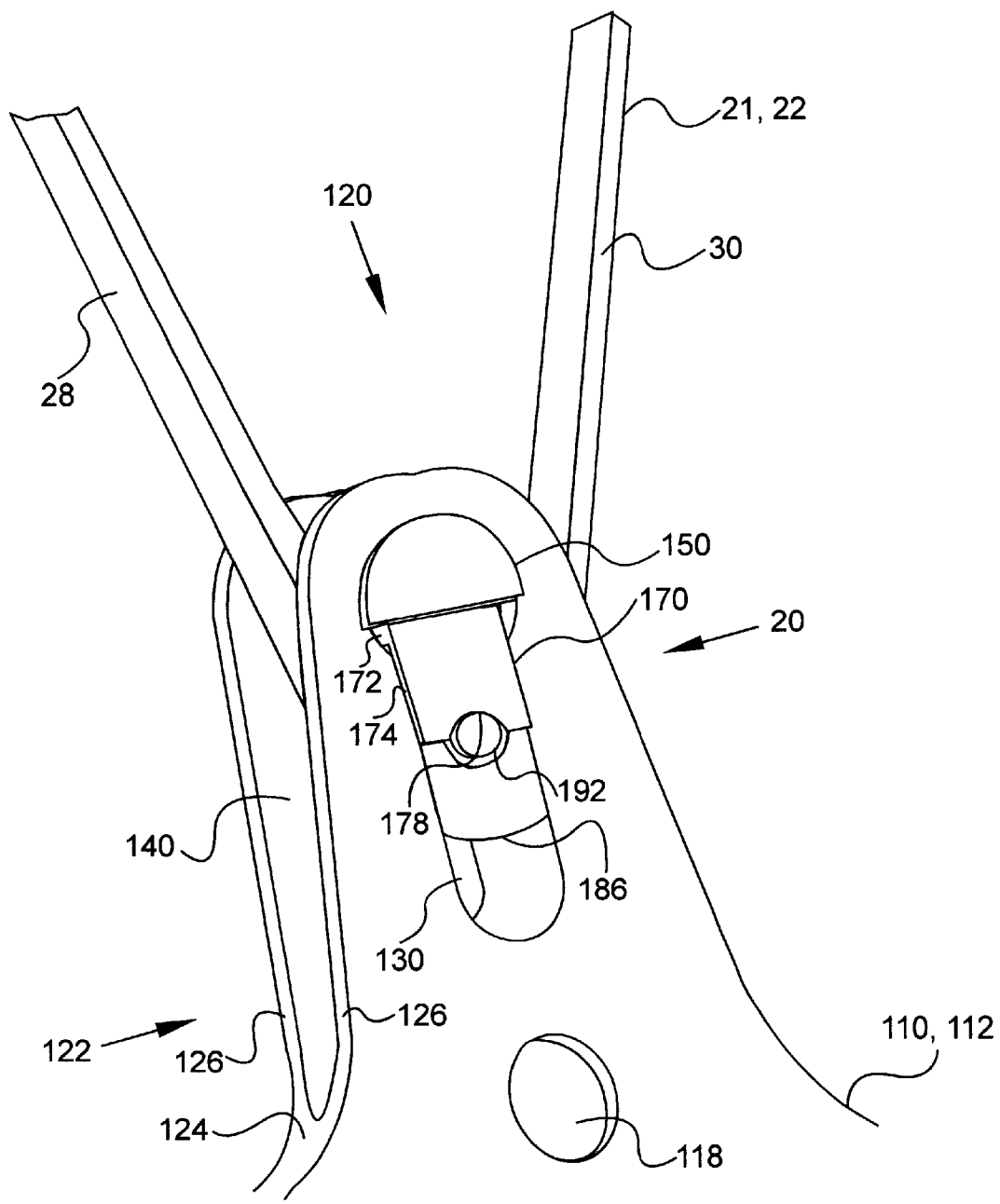
FIG. 8 is a perspective view of a hub pivot and a tensioning mechanism according to the present invention.
Figure 9:
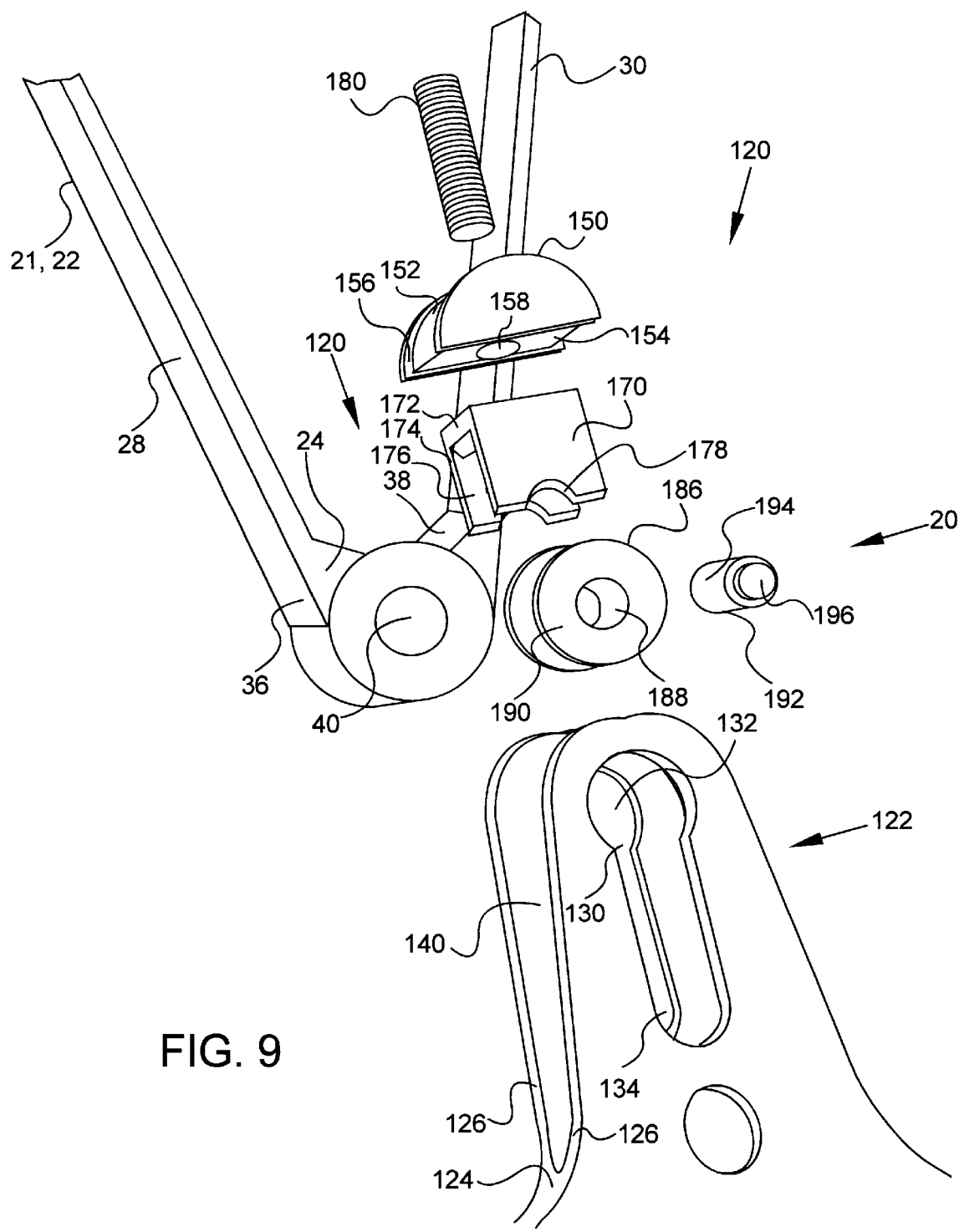
FIG. 9 is an exploded view of the hub pivot and tensioning mechanism of FIG. 5.

Referring to FIGS. 8–9, each tensioning mechanism 120 preferably also acts as a hub pivot 20. Each tensioning mechanism 120 acts independently on an inner vertex 24. In a preferred embodiment, each tensioning mechanism 120 includes a clevis 122. Each clevis 122 preferably includes a base 124 that is secured to ring 114 (see FIG. 7). In the embodiment shown, base 124 is an integral part of spoke anchor 110, 112, but it may be a separate part that is secured to ring 114, such as by welding or mechanical fasteners. Each clevis 122 includes a pair of arms 126 that preferably extend radially outwardly from base 120. Each pair of arms 126 defines an aperture 130 that extends through both arms 126. Each aperture 130 includes a hole 132 near the outer terminus of each arm 126, and a channel 134. In the embodiment shown, channel 134 has a width less than the diameter of hole 132, but the width of channel 134 may be equal to or smaller than the diameter of hole 132. Channel 134 preferably extends radially inwardly from hole 132. Each pair of arms 126 defines a slot 140 that is bound on each axial side by an arm 126.

Tensioning mechanism 120 preferably also includes a reaction pin 150 that may be a half moon pin (which may have a semi-circular cross section or some other similar shape) having a body 152 that fits within hole 132, an inwardly-facing flat surface 154 and flanges 156 extending from opposing termini of body 152. Reaction pin 150 also defines a threaded hole 158 through body 152 normal to surface 154. Body 152 extends between a pair of arms 126 through hole 132 with surface 154 facing inwardly and with flanges 156 abutting arms 126.

Tensioning mechanism 120 preferably also includes a pusher pad 170. Pusher pad 170 includes an outer wall 172 defining a centrally located outwardly-facing circular cavity therein (not shown). Side walls 174 extend from opposing edges of outer wall 172 in a direction normal to outer wall 172 and define a recess 176 therebetween. Each side wall 174 includes an edge that defines a rounded notch 178. Pusher pad 170 fits within channel 134 so that outer wall 172 faces surface 154 of reaction pin 150 and each side wall 174 is adjacent an arm 126 of clevis 122.

Tensioning mechanism 120 also includes a tension adjusting screw 180 that engages the engaging elements of hole 158 in reaction pin 150. The cavity in the outer wall 172 of pusher pad 170 receives an end of tension adjusting screw 180.

Tensioning mechanism 120 preferably also includes a hub bobbin 186. Each hub bobbin 186 includes a cylindrical tube 188 and a pair of substantially parallel radial walls 190 extending outwardly from opposing termini of cylindrical tube 188. Each hub bobbin 186 is wrapped with fibers that form an inner vertex 24 of continuous spoke 21, 22. Each tensioning mechanism 120 preferably also includes a hub attachment pin 192. Each hub attachment pin 192 preferably includes a cylindrical body 194, and cylindrical protrusions 196 extending axially from opposing ends of cylindrical body 194.

Hub bobbin 186 is housed within slot 140 of clevis 122 and cylindrical tube 188 is aligned with channel 134 of aperture 130 in arms 126. Body 194 of hub attachment pin 192 is housed within cylindrical tube 188, and protrusions 196 extend outwardly from cylindrical tube 188 and are received by rounded notches 178 in side walls 174 of pusher pad 170.

Figure 10:
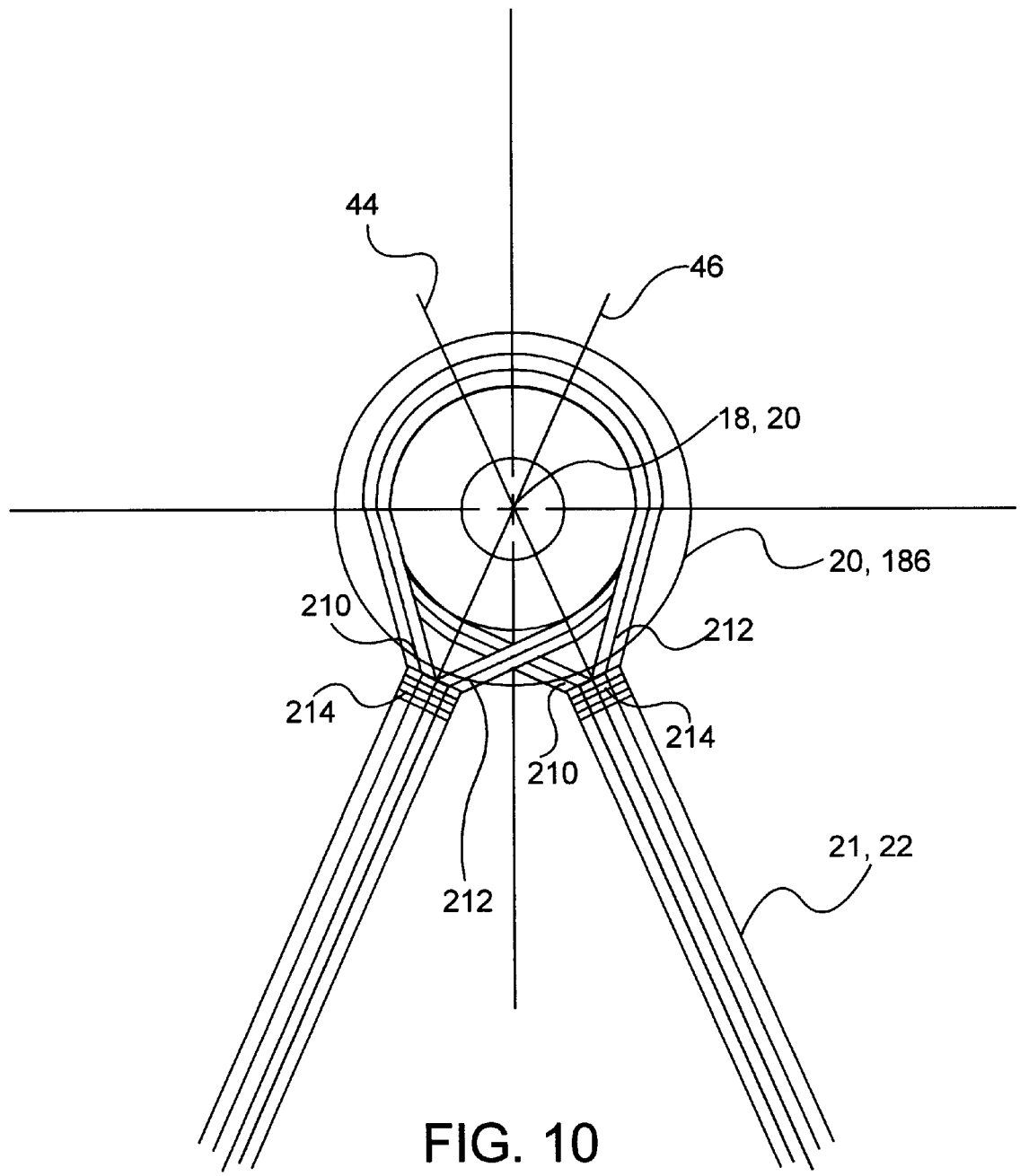
FIG. 10 is a schematic drawing depicting the directions of the fibers about a pivot according to the present invention.

In a preferred embodiment, continuous spoke 21, 22 includes a matrix and fibers supported within the matrix. Preferably, continuous spoke 21, 22 includes a single fiber tow or yarn that is continuously wound to form continuous spoke 21, 22. The fiber may be any fiber that has a high tensile strength. Preferably the fiber is carbon fiber, but the fiber may be fiberglass, a fiber such as the aramid fibers sold under the trademark KEVLAR by E. I. du Pont de Nemours and Company in Wilmington, Del., or some other fiber. The fiber is preferably pre-impregnated with matrix, but the fiber may alternatively be wetted prior to winding. Referring to FIG. 10, the fiber is preferably wound about rim bobbins 70 and hub bobbins 186 in a pattern that produces fibers 210 from each shaft 28, 30 that wrap around each bobbin 70, 186 in a clockwise direction and fibers 212 from each shaft 28, 30 that wrap around each bobbin 70, 186 in a counterclockwise direction, thereby forming a loop around bobbin 70, 186. The fiber tow is preferably wound about the entire continuous spoke 21, 22 from about four times to about ten times. However, the number of wraps will vary depending on the type of use, the types of fiber and matrix, and other factors that affect durability. The fibers 210, 212 are then secured together near each bobbin 70, 186. Fibers 210, 212 may be secured by tying them together with a strong fiber 214, such as the aramid fibers sold under the trademark KEVLAR by E. I. du Pont de Nemours and Company in Wilmington, Del. Alternatively, the fibers could be secured together with a grommet, such as a stainless steel grommet, or with a coiled length of stainless steel wire.

Thus, fibers 210, 212 form a single shaft until the point where they are secured together, and then separate to produce a Y-shaped pattern at the end of each shaft. The Y-shaped pattern at the end of each shaft 28, 30 is thus substantially aligned with the center of pivots 18, 20, rather than being aligned tangentially with the outer surfaces of the cylindrical tubes 72, 188 of bobbins 70, 186. Fibers 210, 212 are then placed in a mold that is preferably pressurized and heated to from about 200 degrees Fahrenheit to about 300 degrees Fahrenheit for 30 minutes to 2 hours depending on the matrix chemistry. The mold may be a flat mold that produces a substantially planar continuous spoke 21, 22, although continuous spoke 21, 22 will form a frustroconical shape when it is secured to wheel 10. The mold may be bowed so that shafts 28, 30 of continuous spoke 21, 22 are pre-bowed and will flatten when secured to wheel 10.

Alternatively, continuous spoke 21, 22 could include plural fiber tows or yarns 210, 212 that together make a single loop around the spoke pattern, with each fiber beginning and ending at approximately the same point on the pattern. In this embodiment, each of the separate fibers 210, 212 is wound around the pattern, and a shrink tubing may be slipped over an end of fibers 210, 212, and slid over the entire pattern. Such tubing shrinks around fibers 210, 212 and provides protection for the fibers against scratching and impact and a finished appearance without the need for a mold.

Referring to FIG. 7, hub 12 is similar to a standard hub, except that it is adapted to receive and mate with spoke anchors 110, 112. The shell of hub 12 may be aluminum, but it may be a composite tube connecting spoke anchors 110, 112. Spoke anchors 110, 112 are preferably made from aluminum because aluminum is lightweight, resistive to corrosion, and relatively strong. The aluminum spoke anchors 110, 112 can be made by using standard CNC mill and lathe operations. However, for mass production, spoke anchors 110, 112 may be aluminum sheet metal that is laser cut and stamped. Alternatively, spoke anchors 110, 112 may be made out of a composite material, which would allow spoke anchors 110, 112 to be lighter. However, the tooling costs of making composite spoke anchors 110, 112 are higher than for aluminum spoke anchors 110, 112.

Bobbins 70, 186 are preferably made of a material that is lightweight and that will minimize wear on vertices 24, 26 of continuous spoke 21, 22 and that will not be susceptible to significant creep. Bobbins 70, 186 also aid in the manufacturing process by allowing fibers 210, 212 to be wrapped around the bobbins 70, 186. Preferably bobbins 70, 186 are aluminum turned on a lathe or a screw machine. Alternatively, bobbins 70, 186 may be some other material, such as reinforced thermoplastic fabricated by injection molding.

Rim tabs 50 are preferably a stiff lightweight material. Moreover, rim tabs 50 are preferably a material that is easily attached to rim 14. In a preferred embodiment, wherein rim 14 is aluminum, rim tabs 14 are aluminum with similar properties to the aluminum in rim 14. In an embodiment wherein rim 14 is 6061 heat treated aluminum, rim tabs 50, also 6061 aluminum, are welded to rim 14. Preferably the weld is done with a tungsten inert gas welder. Heat welding will often cancel the effect of heat treating, so after rim tabs 50 are welded to rim 14, rim 14 is preferably aged at from about 350 degrees Fahrenheit to about 400 degrees Fahrenheit for about 4 hours so that rim 14 and rim tabs 50 regain their strength.

Rim attachment pin 80 is preferably made from a material that has high thread strength and that is light. In a preferred embodiment, rim attachment pin is stainless steel or titanium.

Reaction pin 150 and tension adjusting screw 180 are preferably made from a material that has good thread strength and durability properties and that is resistant to corrosion. Preferably, reaction pin 150 and tension adjusting screw 180 are titanium or stainless steel. Reaction pin 150 may be formed by using a combination of a screw machine for turning and a milling machine for slicing, drilling, and tapping. Tension adjusting screws 180 may be standard screws, preferably socket head set screws. Hub attachment pin 192 is preferably a material that is light weight, resistive to corrosion, and that has high shear strength. In a preferred embodiment, hub attachment pin 192 is stainless steel made on a screw machine. Alternatively, hub attachment pin may be some other material, such as reinforced thermoplastic.

Referring to FIGS. 1–3, in assembling wheel 10, rim tabs 50 are attached to rim 14 (see FIG. 4), and spoke anchors 110, 112 are attached to hub 12 (see FIG. 7). Each inner vertex 24 is then placed within slot 140 of a clevis 122 (see FIG. 8).

Referring to FIGS. 8–9, each tensioning mechanism 120 is then fully assembled by first placing reaction pin 150 within aperture 130. Reaction pin 150 is then preferably pushed through hole 132 with flat surface 154 being parallel to channel 134. After reaction pin 150 is within hole 132 and each flange 156 is on an opposing side of an arm 126, reaction pin 150 is rotated 90 degrees so that flat surface 154 is facing base 124 of clevis 122. Hub attachment pin 192 is placed within cylindrical tube 188 of hub bobbin 186 and pusher pad is placed within slot 140 of clevis 122 so that recess 176 in pusher pad 170 receives hub bobbin 186 and rounded notches 178 receive protrusions 196 of hub attachment pin 192 on opposing sides of hub bobbin 186. Each tension adjusting screw 180 is then turned through hole 158 in reaction pin 150 so that an end of tension adjusting screw 180 abuts the circular cavity in outer wall 172. Each outer vertex 26 of continuous spokes 21, 22 is then attached to rim tabs 50 by rim attachment pins 80 (see FIG. 4).

Each tension adjusting screw 180 is then turned further to bias pusher pad 170 inwardly, thereby biasing each inner vertex 24 inwardly and tensioning continuous spoke 21, 22. Each tensioning mechanism 120 may be independently adjusted by adjusting tension adjusting screw 180 to tension or loosen continuous spoke 122 or to true or dish wheel 10.

Referring to FIG. 2, in operation, when a force is applied to a shaft 28, 30, because each shaft 28, 30 is able to rotate slightly about a rim pivot 18 and a hub pivot 20, shaft 28, 30 bears the force longitudinally along shaft 28, 30. Because shaft 28, 30 is aligned with the center of a rim pivot 18 at an outer end 30 and the center of a hub pivot 20 at an opposing inner end 32, the force resulting from tension within the shaft will not create a significant moment about a hub pivot 20 at an inner vertex 24 or about a rim pivot 18 at an outer vertex 26. If a significant moment were created about a pivot 18, 20 at a vertex 24, 26, the moment would tend to rotate the vertex 24, 26 and each shaft 28 connected to the vertex. With a stiff continuous spoke 21, 22, such as a composite spoke, the material would not be able to bear the bending and shear stresses created by such a moment. Accordingly, the moment could cause premature failure of the continuous spoke 21, 22 because it would not be directed longitudinally along the shafts 28, 30. Of course, such a premature failure could be compensated for by adding material to vertex 24, 26 and to shaft 28. However, the added material would also add weight to the rim.

Because each shaft 28, 30 forms a path that is offset from the rotational axis of hub 12, each shaft 28, 30 will transmit torque from hub 12 to rim 14 by pure tension. As discussed above, each shaft 28, 30 bears tension longitudinally along the shaft 28, 30. A torque in hub 12 will produce a tension in shafts 28, 30 that will transmit a force to rim 14, causing a torque in rim 14. More specifically, if a clockwise torque 350 is applied to hub 12, hub 12 will pull on hub end 36 of each shaft 28, tensioning the shaft 28. The tension in each shaft 28 will cause rim end 32 to transmit a force 352 to rim 14 by pulling on rim 14, thereby applying a torque 354 to rim 14 in the same direction as the torque 350 originally applied to hub 12. Similarly, if a counterclockwise torque 356 is applied to hub 12, hub 12 will pull on the hub end 38 of each shaft 30, tensioning the shaft 30. The tension in each shaft 30 will cause the rim end 34 to transmit a force 358 to rim 14 by pulling on rim 14, and thereby applying a torque 360 to rim 14 in the same direction as the torque 356 originally applied to hub 12.

Moreover, if a transverse, or axial force is applied to some point on rim 14, because shafts 28, 30 angle axially outwardly, rim 14 will pull on rim end 32, 34 of shafts 28, 30 on the side axially opposite the direction of the force, placing them in tension. The tension in each shaft 30 will cause hub end 36, 38 to transmit a force to hub 12 by pulling on hub 12, and thereby transmitting the force to hub 12.

If a radial force is applied to some point on rim 14, rim 14 will pull on rim end 32, 34 of shafts 28, 30 on the side radially opposite the direction of the force, placing them in tension. The tension in each shaft 30 will cause hub end 36, 38 to transmit a force to hub 12 by pulling on hub 12, and thereby transmitting the force to hub 12.

By transmitting each of the forces described above and combinations thereof, spoke system 16 keeps rim 14 and hub 12 stationary relative to each other. In so doing, the only significant stresses applied to shafts 28, 30 are pure tension stresses. In a preferred embodiment, continuous spoke 21, 22 is a composite material that has superior durability and strength in pure tension. Thus, the wheel and spoke system of the present invention produces superior strength and durability without excess weight.

Figure 11:
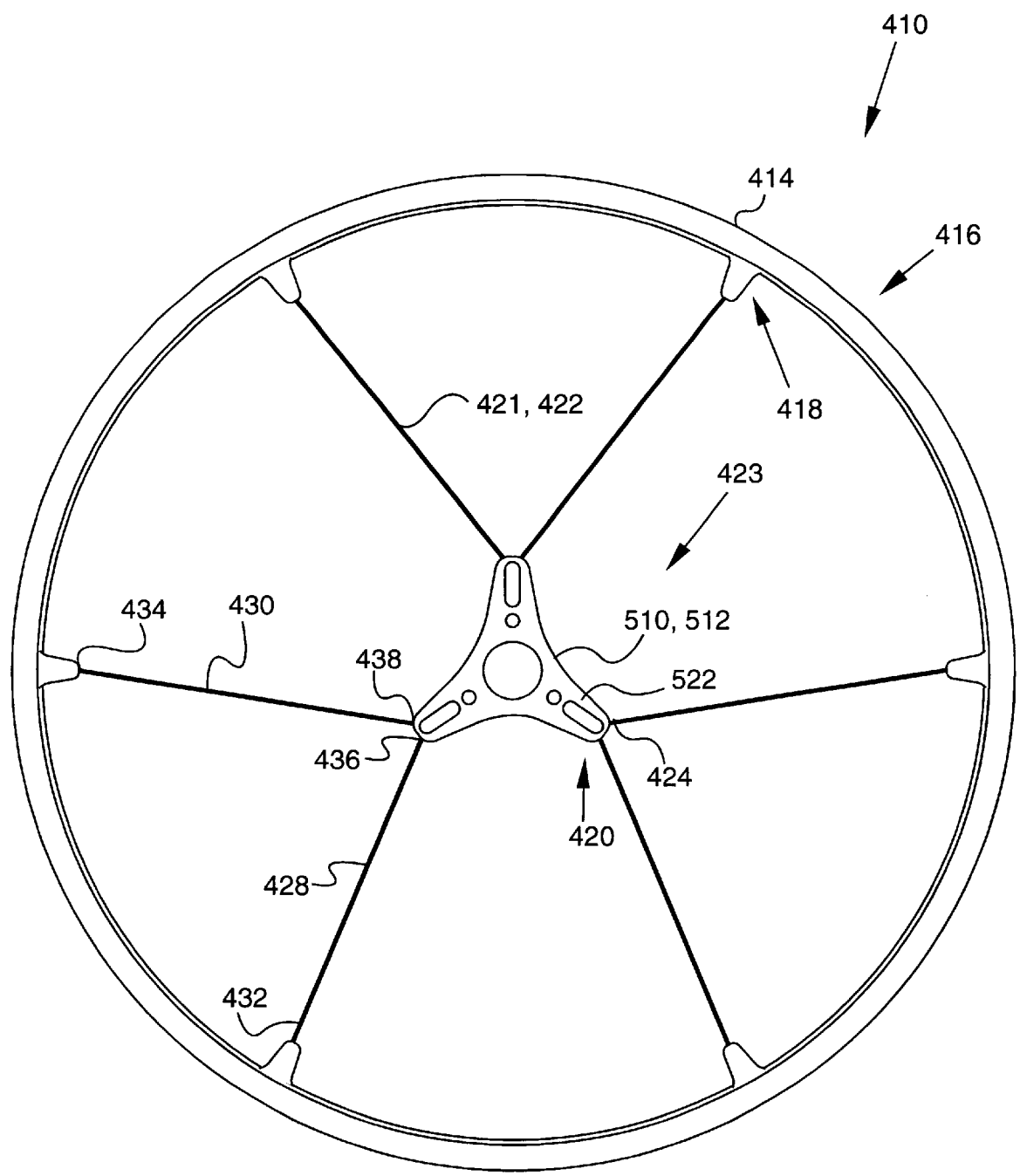
FIG. 11 is a side view of an alternative embodiment of a wheel according to the present invention.

Referring to FIG. 11, spoke system 416, rather than including continuous spokes, may alternatively include plural spokes 421 on the right side and plural spokes 422 on the left side with each spoke 421, 422 including two integral shafts 428, 430. Shafts 428, 430 each extend along a substantially linear path that is substantially aligned with the center of a rim pivot 418 and the center of a corresponding hub pivot 420. Spokes 421, 422 form an inner vertex 424 at a hub end 436, 438 of shafts 428, 430 that is attached to a hub pivot 420 as described above. Spokes 421, 422 terminate at an integral rim end 432, 434 of each shaft 428, 430. Each rim end 432, 434 preferably forms a loop around a rim pivot 418 as described above. Tensioning system 423 includes spoke anchors 510, 512 that each include three devises 522, but that are otherwise similar to the spoke anchors described above. In operation, wheel 410 and spoke system 416 operate similarly to the wheel and spoke system described above.

The embodiment shown in FIG. 11 may be more advantageous than previously discussed embodiments because it requires fewer shafts, fewer inner vertices, fewer tensioning mechanisms, and thus less weight for an equal or greater number of rim pivots. The embodiment shown in FIG. 1 produces a different aesthetic effect than the embodiment of FIG. 11, but it has not yet been determined which aesthetic effect is more pleasing. It is likely that one embodiment will be more pleasing to one set of consumers and the other will be more pleasing to another set of consumers.

Alternatively, each spoke may include only a single shaft (not shown) that includes an integral hub end that forms a loop around a hub pivot at a first terminus and an integral rim end that forms a loop around a rim pivot at a second terminus. As with the embodiments described above, each shaft extends along a substantially linear path that is substantially aligned with the center of a rim pivot and the center of a corresponding hub pivot. The integral formation of a loop around the pivots produces a spoke system with increased strength and durability and minimal weight. Such an embodiment also operates similarly to the wheel and spoke system described above, and the connections and tensioning system may be substantially the same as described above.

While the invention has been particularly shown and described with reference to preferred embodiments thereof, it will be understood by those skilled in the art that various changes in form and details may be made therein without departing from the spirit and scope of the invention. For example, those skilled in the art will understand that the materials of the various aspects of the invention, such as the continuous spoke, described above can be other than those specifically set forth above.

What is claimed is:

1. A spoke system, comprising:
   plural rim pivots;
   plural hub pivots;
   plural shafts each extending along a substantially linear path that is substantially aligned with the center of a rim pivot and the center of a corresponding hub pivot, each plural shaft including an integral rim end forming a loop around a rim pivot and an integral hub end forming a loop around a hub pivot;
   a tensioning system for tensioning the shafts.

2. The spoke system of claim 1, wherein a pair of the shafts form an integral spoke.

3. The spoke system of claim 1, wherein the shafts form a continuous spoke including at least three inner vertices, each inner vertex being attached to a hub pivot, and at least three outer vertices, each outer vertex being attached to a rim pivot.

4. The spoke system of claim 1, wherein the tensioning system includes plural tensioning mechanisms.

5. The spoke system of claim 4, wherein one of the tensioning mechanisms biases each hub pivot away from a corresponding rim pivot.

6. The spoke system of claim 5, wherein each tensioning mechanism includes a clevis having a base adapted to be attached to a hub and two arms extending from the base; a hub attachment pin intermediate the two arms extending through a central portion of an integral hub end, thereby forming one of the hub pivots; and a tension adjusting screw biasing the hub attachment pin away from a corresponding rim pivot.

7. The spoke system of claim 6, wherein each tensioning system further includes a reaction pin extending between the two arms and a pusher pad abutting the reaction pin and abutting the hub attachment pin, and wherein the tension adjusting screw biases the pusher pad away from a corresponding rim pivot, thereby biasing the hub attachment pin away from a corresponding rim pivot.

8. The spoke system of claim 6, wherein the tensioning system further includes a hub anchor adapted to be attached to the hub, the hub anchor including a ring, each clevis being attached to the ring.

9. The spoke system of claim 1, wherein the hub pivots each include a hub bobbin that receives an inner integral hub end and a hub attachment pin extending through the hub bobbin.

10. The spoke system of claim 1, wherein the shafts each include a matrix and at least one fiber supported within the matrix.

11. The spoke system of claim 10, wherein the at least one fiber includes at least one carbon fiber.

12. A wheel, comprising:
    a rim;
    a hub;
    plural rim pivots attached to the rim;
    plural hub pivots attached to the hub;
    plural shafts each extending along a substantially linear path that is substantially aligned with the center of a rim pivot and the center of a corresponding hub pivot, each plural shaft including an integral rim end forming a loop around a rim pivot and an integral hub end forming a loop around a hub pivot, at least a pair of the shafts forming an integral spoke; and
    a tensioning system for tensioning the shafts.

13. The wheel of claim 12, wherein plural pairs of the shafts form integral spokes, and wherein each spoke defines an inner vertex at the integral hub end of each shaft.

14. The wheel of claim 12, wherein the shafts form a continuous spoke including at least three inner vertices, each inner vertex being attached to a hub pivot, and at least three outer vertices, each outer vertex being attached to a rim pivot.

15. The wheel of claim 12, wherein the tensioning system includes plural independent tensioning mechanisms, and one of the tensioning mechanisms biases each hub pivot away from a corresponding rim pivot.

16. The wheel of claim 15, wherein each tensioning mechanism includes a clevis with a base attached to the hub and two arms extending from the base; a reaction pin extending between the two arms; a hub attachment pin extending through a central portion of an integral hub end to form a hub pivot; a pusher pad abutting the hub attachment pin; and a tension adjusting screw biasing the pusher pad inwardly, and thereby biasing the hub pivot away from a corresponding rim pivot.

17. The wheel of claim 16, wherein the tensioning system further includes a hub anchor attached to the hub, the hub anchor including a ring, and wherein each clevis is attached to the ring, wherein the two arms extend from the hub toward the rim.

18. The wheel of claim 17, wherein the reaction pin defines engaging elements that mate with the adjusting screw, and the adjusting screw abuts the pusher pad to bias it away from the reaction pin.

19. The wheel of claim 12, wherein the continuous spoke includes a matrix and at least one fiber supported within the matrix.

20. The wheel of claim 19, wherein the at least one fiber includes a fiber wound plural times continuously about the spoke.

21. The wheel of claim 19, wherein the at least one fiber includes plural fibers wound about the spoke.

22. The wheel of claim 19, wherein the at least one fiber includes at least one carbon fiber.

23. A wheel, comprising:
   a rim;
   a hub having a rotational axis;
   at least three rim pivots attached to the rim;
   plural shafts each extending along a substantially linear path between a rim pivot and a corresponding hub pivot, each plural shaft including an integral rim end forming a loop around a rim pivot and an integral hub end forming a loop around a hub pivot; and
   plural tensioning mechanisms, such that a tensioning mechanism biases each integral hub end, thereby tensioning the shafts, each tensioning mechanism including a clevis with a base attached to the hub and two arms extending from the base; a reaction pin extending between the two arms; a hub attachment pin extending through a central portion of an integral hub end to from a hub pivot; a pusher pad engaging the hub attachment pin; and a tension adjusting screw engaging the reaction pin and biasing the pusher pad so as to bias the hub attachment pin away from a corresponding rim pivot.

24. The wheel of claim 23, wherein plural pairs of the shafts form integral spokes, and wherein each spoke defines an inner vertex at the integral hub end of each shaft, the inner vertex being attached to a hub pivot and the integral rim end of each shaft being attached to a rim pivot.

25. The wheel of claim 23, wherein the shafts form a continuous spoke including at least three inner vertices, each inner vertex being attached to a hub pivot, and at least three outer vertices, each outer vertex being attached to a rim pivot.

26. The wheel of claim 25, wherein the two arms of the clevis extend from the hub toward the rim, and wherein the reaction pin defines a hole with engaging elements, the engaging elements mate with the adjusting screw, and the adjusting screw abuts the pusher pad to bias it away from the reaction pin.

27. The wheel of claim 26, wherein the tensioning system further includes a hub anchor attached to the hub, the hub anchor including a ring, and wherein each clevis is attached to the ring.

28. A spoke tensioning mechanism, comprising
   a clevis with a base and two arms extending from the base;
   a reaction pin extending between the two arms;
   a hub attachment pin for engaging a loop formed by a spoke;
   a pusher pad engaging the hub attachment pin; and
   a tension adjusting screw engaging the reaction pin and biasing the pusher pad so as to bias the hub attachment pin away from the reaction pin.

29. The mechanism of claim 28, wherein the reaction pin defines a hole with engaging elements that mate with the adjusting screw.

30. The mechanism of claim 28, wherein the adjusting screw abuts the pusher pad to bias it relative to the reaction pin.

* * * * *